Nov. 30, 1926.
F. K. KNILL
FISH LURE
Filed June 15, 1925
1,609,090
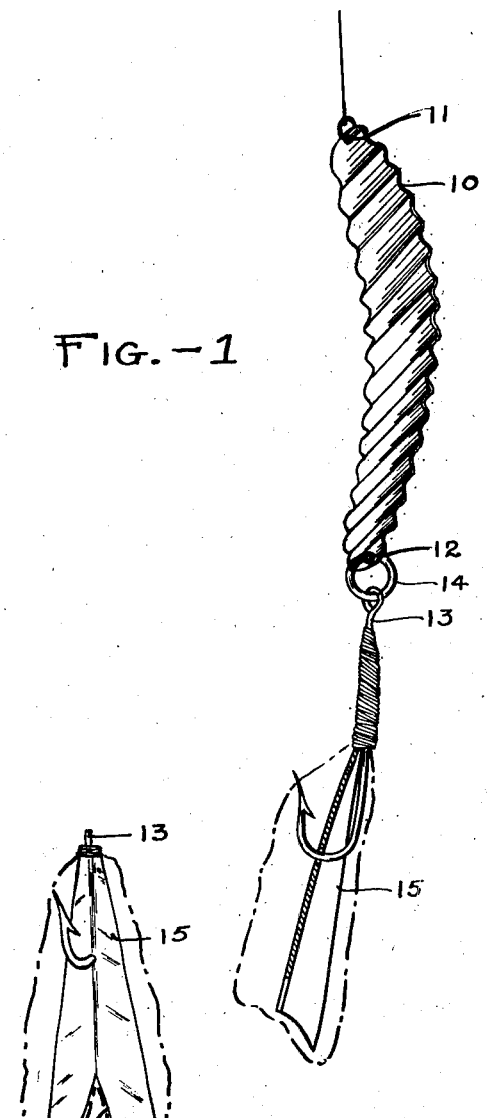
FIG.-1
FIG.-3
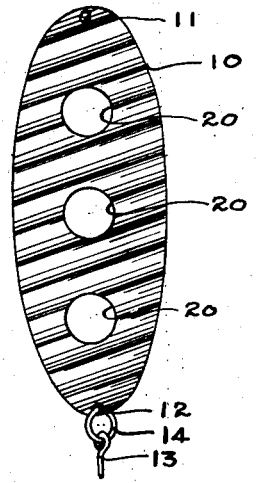
FIG.-2
Inventor
Frank K. Knill
By Bates Macklin Golrick & Peare
Attorneys Patented Nov. 30, 1926.

1,609,090

UNITED STATES PATENT OFFICE.

FRANK K. KNILL, OF VERMILION, OHIO.

FISH LURE.

Application filed June 15, 1925. Serial No. 37,057.

This invention relates to artificial fish lures particularly to the type which is adapted to be moved either by trolling or casting through the water.

One of the objects of the present invention is the provision of a lure which moves in an irregular path through the water and which may be employed either as a surface or under water lure.

A further object is to provide a bait which may be cheaply made and which is not easily damaged after a fish has been caught.

The preferred form for carrying out my invention will be fully set forth in the following description and is illustrated in the drawings wherein Fig. 1 is a perspective view of a lure embodying my invention; Fig. 2 is a plan view of the lure showing a modified arrangement and Fig. 3 is a plan view of a bait which may be used with my type of lure.

My invention is shown as embodying a spoon 10, one end of which, as at 11, is arranged to be fastened to a line, and the other end 12 of which is adapted to receive a hook 13. The spoon, as shown in Figs. 1 and 2, is elliptical in shape and is corrugated for substantially the entire length thereof. The corrugations extend obliquely to the major axis of the spoon, while the spoon is preferably curved so that one side is concave while the other side is convex for substantially the entire length thereof.

I have shown the spoon as having an artificial bait 15 carried thereby. The bait illustrated comprises a piece of tanned sheep skin which is formed in the shape of a wedge as shown in Fig. 3 with the wide end of the wedge being slit to form a V-notch as at 16. The slitting of the sheep skin, as illustrated, prevents the sides thereof from sticking together when the lure is being moved through the water. The bait is also bent upon itself along the longitudinal mid-portion, while the apex of the notch preferably coincides with the line on which the bend occurs.

In Fig. 2, I have shown a modified form of the spoon wherein openings 20 are arranged at spaced intervals preferably along the midportion thereof. As the bait is being drawn through the water, these openings function to allow a stream to flow through the spoon and thereby make the lure more attractive while it is being drawn through the water.

An advantage of a lure made in accordance with my invention is the fact that the oblique corrugations cause the spoon to move along an irregular path while it is being drawn through the water.

A further advantage is the fact that the spoon may be readily stamped from light metal and that the entire lure may be readily assembled in an expeditious manner.

Having thus described my invention I claim:

1. A spoon for a fish lure comprising a one-piece member having parallel oblique corrugations extending substantially the entire length thereof, and each corrugation extending entirely across the member.

2. A spoon for a fish lure comprising a one-piece member curved intermediately and of substantially elliptical shape and having parallel corrugations thereon extending obliquely to one of the axes thereof and entirely across the member.

3. A fish lure comprising a one piece curved member having parallel oblique corrugations extending from one edge to the other and having through it a set of perforations and having provision at the opposite ends for attachment of the line and the hook respectively.

In testimony whereof, I hereunto affix my signature.

FRANK K. KNILL.